Figure 1:
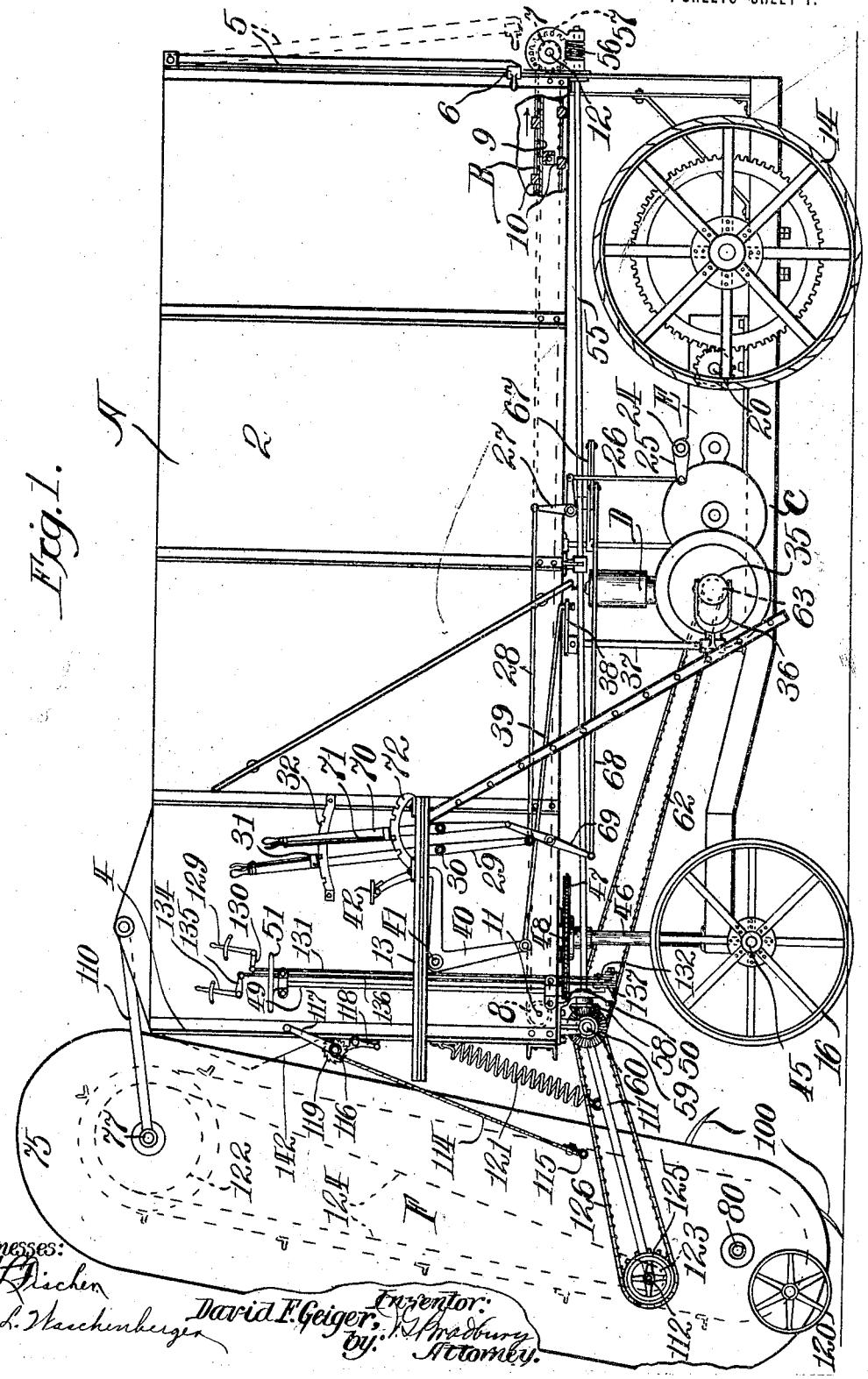

D. F. GEIGER.
LOADING MACHINE.
APPLICATION FILED MAY 5, 1913.

1,166,897.

Patented Jan. 4, 1916.
4 SHEETS—SHEET 1.

Witnesses:
David F. Geiger, Inventor:
by Attorney.

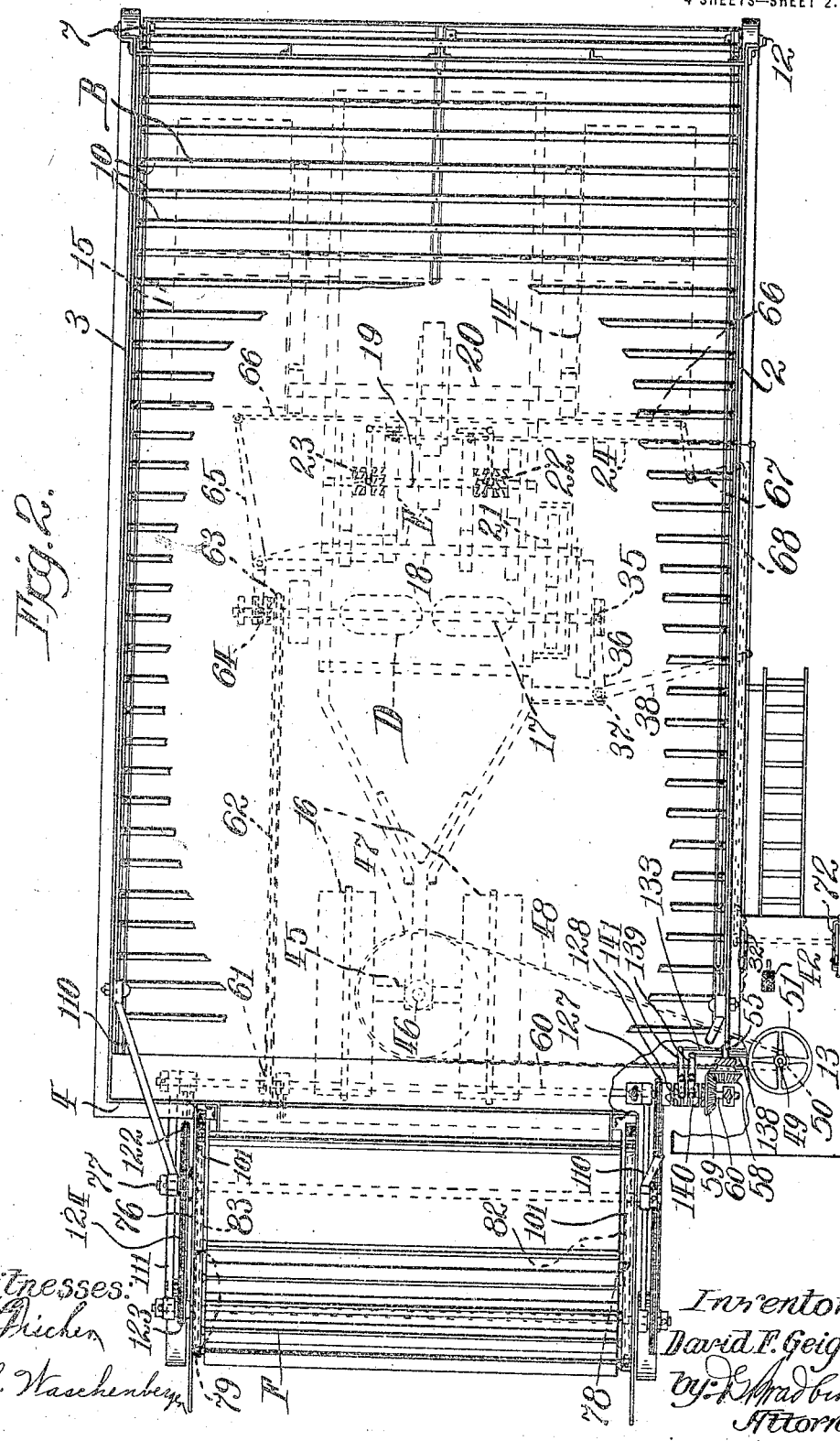

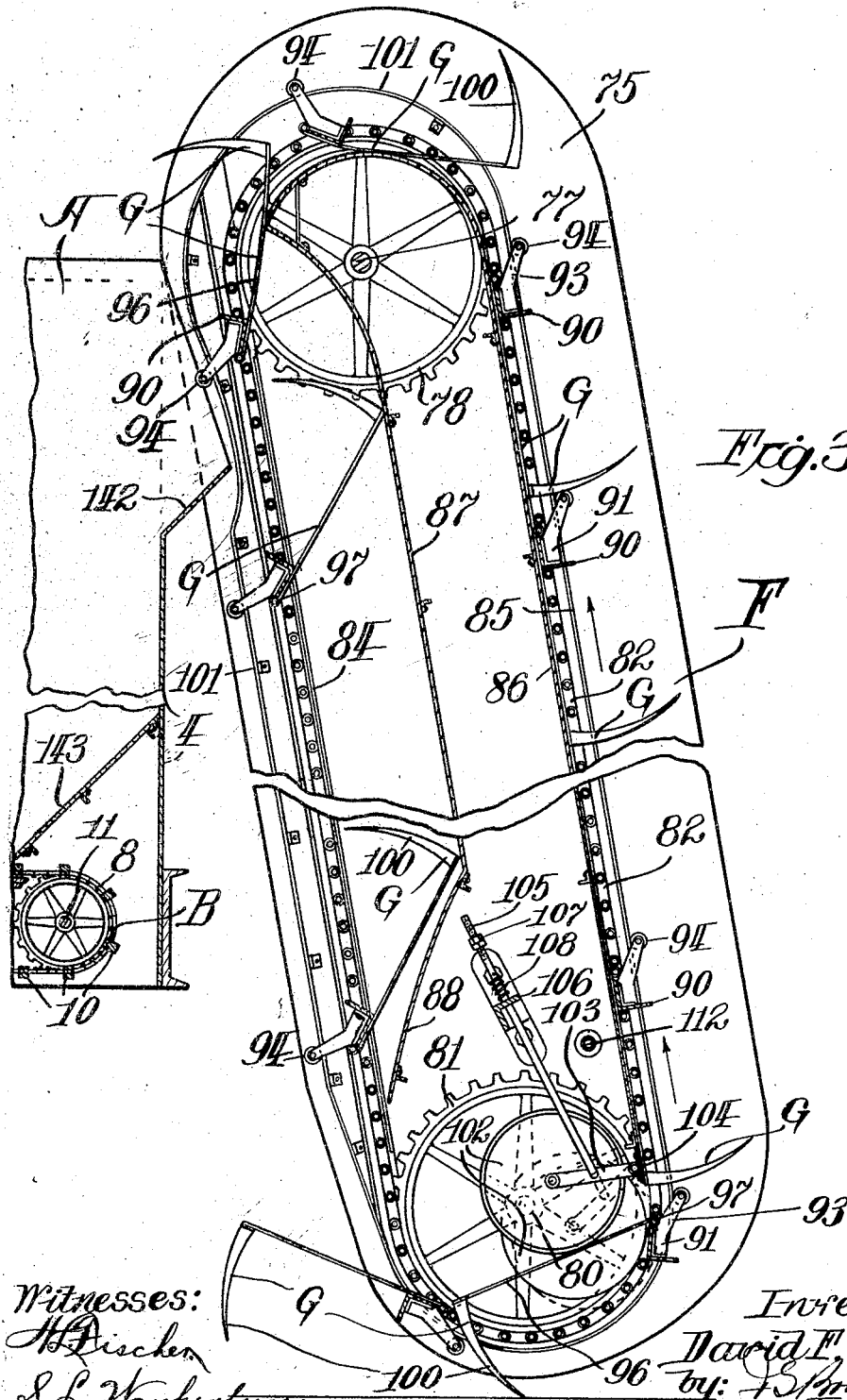

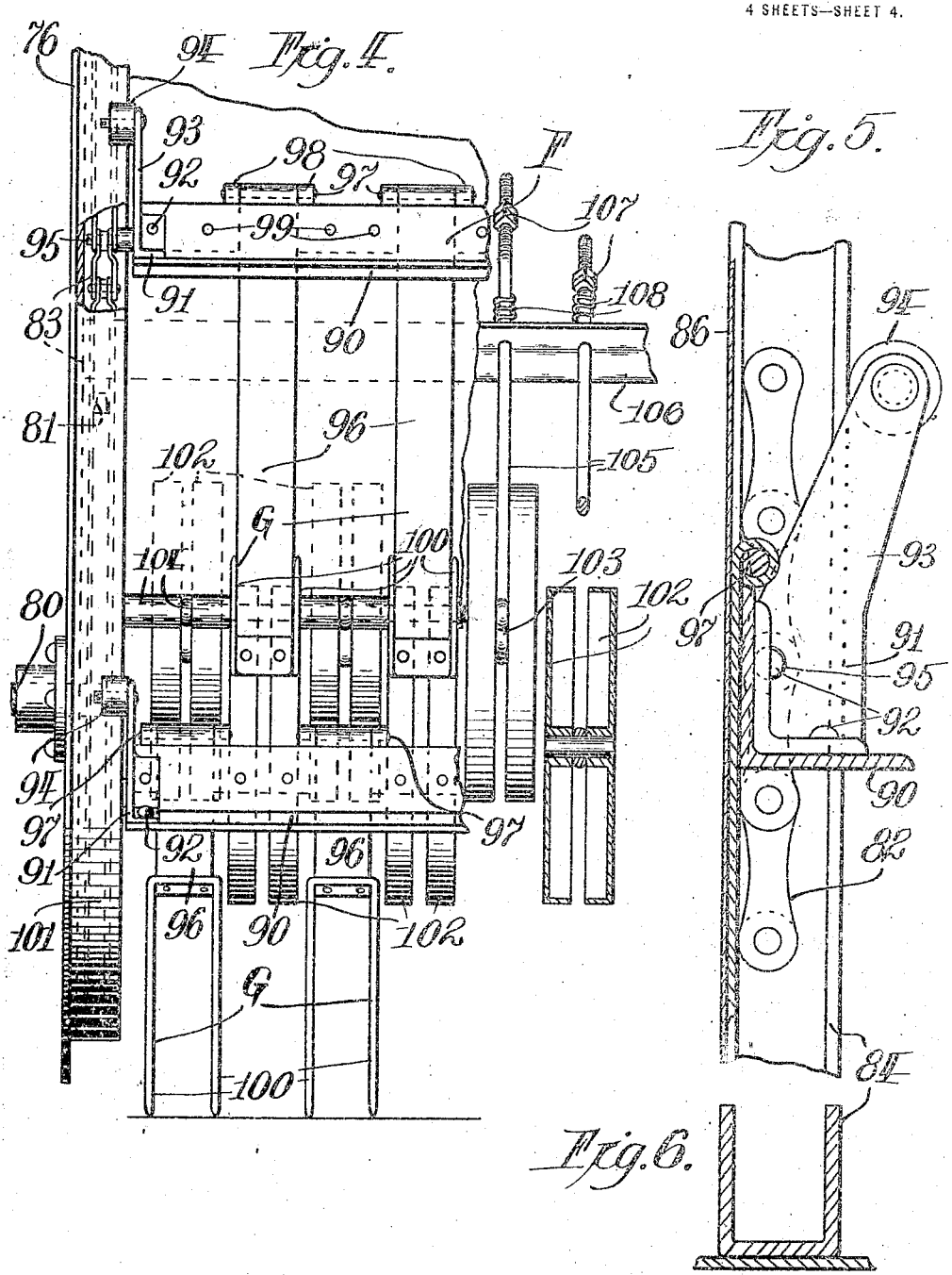

UNITED STATES PATENT OFFICE.

DAVID F. GEIGER, OF FARGO, NORTH DAKOTA, ASSIGNOR OF ONE-THIRD TO E. C. WINGIRE, OF FARGO, NORTH DAKOTA.

LOADING-MACHINE.

1,166,897.　　　　　Specification of Letters Patent.　　　Patented Jan. 4, 1916.

Application filed May 5, 1913. Serial No. 765,452.

*To all whom it may concern:*

Be it known that I, DAVID F. GEIGER, a citizen of the United States, residing at Fargo, in the county of Cass and State of North Dakota, have invented a new and useful Improvement in Loading-Machines, of which the following is a specification.

The primary object of this invention is the production of a machine for automatically gathering shocks of grain, hay, etc., in the field and quickly conveying and depositing the same at a threshing machine, stack or store house, all without the use of horses and with a minimum amount of hand labor.

This invention is adapted by the use of a self propelled vehicle, to simulate hand labor in quickly gathering grain, hay and other growth with little power and expense, whereby a large amount of work is accomplished under the direction and control of a single operator.

The machine which I have produced is designed with a multiplicity of adjustments whereby the various parts may be operated at will and automatically. For illustration the parts which gather and pick up the grain are made to yield and sweep over obstructions without breaking any of the parts of my invention, and at the same time are made to pick up all of the bundles, shattered grain and hay with practically no waste.

The invention also provides a coöperative unloading of the material as well as a means for adjusting the position of the load while the pick up or gathering mechanism is in operation.

Further objects and advantages will be apparent from the following description following which the novel features of my invention will be particularly pointed out in the claims.

In the accompanying drawings forming part of this specification, Figure 1 is a side elevation partly broken away and in section illustrating my invention; Fig. 2 is a plan, part of the dumping conveyer being broken away; Fig. 3 is a vertical section of the elevator carrying the rakes which gather and pick up the shocks, shattered grain and hay, said elevator being illustrated associated with the forward end of the body of the vehicle, the latter being shown partly in section; Fig. 4 is an enlarged detail looking at the front of the lower end of the elevator; Fig. 5 is an enlarged detail partly in section of the elevator mechanism, and Fig. 6 is a detail in section of one of the channel members in which the belts run.

In the drawings, A indicates the body of a vehicle of any suitable construction provided with high sides 2 and 3, front end 4 and a rear end gate 5, which is pivoted at its upper end to the sides and adapted to swing out at its lower end, the latter being held closed by the latch 6 of any suitable construction. The floor of the body is in the form of an endless flexible apron B of usual construction carried by end sprockets 7 and 8 over a bottom 9 made of sheet metal or other suitable material, said apron being provided with flights 10, which when the apron is revolved in the direction of the arrow illustrated in Fig. 1 are adapted to engage and convey the contents of the body toward or through the gate way at the rear end. The sprockets 7 and 8 are mounted upon shafts 11 and 12, which are power driven as will be hereinafter described. Extending laterally to one side and upon the forward end of the body is a platform 13, upon which the person driving or operating the vehicle may stand or sit.

The body A is mounted upon a suitable running gear C, which is carried by the driven wheels 14 and 15, and the forward steering wheels 16. The driven wheels are revolved by any suitable prime mover such as a gas engine D mounted upon the running gear and operatively connected with the driving wheels 14 and 15 to revolve them, by any suitable transmission mechanism such as E. This transmission mechanism as illustrated has a main drive shaft 17 directly driven by the engine, counter shafts 18, 19 and 20, carrying reduction gears 21, which serve in the usual manner to transmit motion from the engine to the drive wheels at suitable speed and in either forward or backward direction at the will of the operator. To change the speed of operation of the drive wheels, suitable clutches 22 and 23 (see Fig. 2), are interposed in the transmission mechanism which are controlled by the rock shaft 24, (see Fig. 1), lever arm 25, rod 26, bell crank 27, rod 28, and handle lever 29, said parts being pivotally secured together and said handle lever pivotally mounted at 30 between its ends on the frame of the body and provided with a lock 31, coöperating with the teeth of the quadrant 32, whereby shifting of the lever 29 causes the operation of the clutches 22 and 23 to so connect the transmission mechanism as to selectively vary the speed of operation of the vehicle. This mechanism also provides in the usual manner for the reversal of the machine to change the direction in which the drive wheels revolve.

To throw the transmission mechanism into and out of operative connection with the engine a main friction clutch 35, (see Fig. 2), is mounted upon the main drive shaft 17, and is thrown into and out of connection by means of the lever 36, carried by the vertical shaft 37, journaled in the frame of the running gear and carrying an operating lever 38, (see Fig. 1) on its upper end. This operating lever is connected by the rod 39 to the depending arm of the bell crank 40, which is pivotally mounted on the frame of the body at its angle by the bolt 41, said bell crank being formed on its operating arm with a foot piece 42 extending up freely through the platform 13. By pressing down upon the foot piece 42, the clutch is disconnected and when released the clutch being of the usual spring type throws itself into connection. The neutral position of the operating lever 29 acts in the usual manner to free the transmission mechanism from connection with the engine. This part of my invention being of usual construction may be of any type for propelling the machine.

The forward wheels 16 (see Fig. 2), are illustrated mounted upon the axle 45, which in turn is swiveled midway between its ends upon the running gear by the king bolt 46, said bolt carrying a large sprocket 47 over which the chain 48 passes. Extending up through the platform 13 and erected in vertical position on the side of the body is a steering post 49 carrying on its lower end a small sprocket wheel 50, and upon its upper end a hand steering wheel 51. The chain 48 also passes around the small sprocket wheel, and by turning the wheel 51 the carrying wheels 16 are turned to guide the vehicle. This mechanism may be of any usual type for accomplishing the function of steering the vehicle.

To operate the apron B by power, the shaft 12 is revolved by a longitudinal counter shaft 55, (see Fig. 1) which is journaled along side of the body and carries a worm pinion 56, the teeth of which, mesh with the teeth of the worm gear 57 on the shaft 12. The forward end of the counter shaft 55 carries a bevel gear 58, the teeth of which mesh with another bevel gear 59 on the transverse counter shaft 60, (see Fig. 2), which is journaled across the forward end of the body. This transverse counter shaft 60 is driven by a sprocket 61, chain 62 and drive sprocket 63, forming the driven member of a clutch, the latter being journaled freely upon the main drive shaft 17. The main drive shaft carries a clutch 64, which is adapted to transmit motion to the clutch member of the drive sprocket 63, said clutch 64 being feathered on the main drive shaft and slid longitudinally on shaft 17 into and out of communication with the drive sprocket 63, by the lever 65, operating rod 66, bell crank 67, rod 68 (see Fig. 1) rocker arm 69 and operating handle 70, said handle extending up through the platform 13, and carrying a lock 71, which coöperates with the teeth of quadrant 72 to hold the handle in selected position when the clutch 64 is in or out of connection. By this mechanism the apron in the body may be made to dump the contents through the end gate way by power derived from the prime mover at the will of the operator. The parts described may be of usual form for the purpose of coöperating with my invention or it is not necessary to employ all of the mechanism described, for instance the dumping mechanism may be omitted and the contents of the body removed by hand, or in any suitable manner.

At the forward end of the machine is an elevator F, constituting what I choose to term the "gathering or pickup mechanism" which is adapted to rake shocks of grain, hay, etc., in a field into the body of the vehicle. This elevator is in the form of a frame having a pair of sides 75 and 76, spaced apart and between which at the upper end is a transverse shaft 77, carrying sprockets 78 and 79 on each side. At the lower ends of the sides are stub shafts 80, each of which carries a sprocket 81. A pair of endless chain belts 82 and 83 are passed around the pairs of sprockets and extend up along each side of the frame. The laps or sides of each belt are made to travel in channel shaped pieces 84 and 85, which are mounted upon the sides of the frame. These channel pieces steady the belts and prevent them from sagging. Extending across and secured between the sides of the frame is a floor 86, which serves to support the grain or hay as it is being elevated. This floor curves up around the upper shaft 77, and then turns in abruptly below said shaft and downwardly at the back of the frame between the sides until nearing the lower sprockets when it again turns out to near the channel pieces 84. The inturned portion 87 and outturned portion 88 act as a guide for the teeth of the rake to be hereinafter described. Spaced equally apart are a series of sets of rakes G mounted upon the chains for the purpose of engaging the shocks of grain and hay and lifting them into the body A. A description of a single set of these rakes will suffice as they are all similar and their mode of operation is the same. Secured across between the pair of chains is an angle bar or flight 90, one side of which is lower most when on the front of the elevator and extends outwardly, thus forming with its adjacent side a cup on the elevating side of the elevator to catch any shattered grain and deposit it in the body as the belts pass around the upper sprockets. This angle bar has its ends secured to brackets 91 (see Fig. 4), by riveting such as at 92, and is formed with an upward and outward extension 93, (see Fig. 5), upon the extremity of which is mounted an antifriction roller 94. The brackets 91, on the opposite ends of the bars 90 are pivotally secured to links of the belts 82 and 83 so as to hang freely, and the antifriction rollers 94 are adapted to ride upon the outermost faces of the channel members 85. To the inner most face of the angle bar 90 is secured the depending flat springs 96, ends of which are pivotally mounted by the pins 97, between brackets 98, which are riveted or otherwise rigidly secured at 99 on the angle bar. Each of these springs carries upon its lower end a rake or fork G having tines 100. The series of forks G and springs 96 which carry them are spaced evenly apart across the elevator, the position of the successive sets of rakes being staggered or offset so that the rakes follow the spaces between the forks in advance and rake the entire surface of the ground between the sides of the elevator.

Mounted upon the inner face of each side of the elevator frame is a track 101, which acts as a continuation of the outer surface of the channel piece 85, upon which the antifriction rollers 94 ride. This extension is so shaped and the mounting of the antifriction roller on the angle piece 90 so positioned that as the rakes travel upwardly in the direction of the arrow indicated in Fig. 3, the antifriction rollers hold the rakes against the floor 86, and as the forks travel over the upper end of the elevator, the antifriction rollers continue holding them impinging against the floor 86, causing the rakes to tilt outwardly and assume the most advantageous position whereby the bundles of grain and hay are pitched into the body A, as the rakes swing over the upper end of the elevator. As the rakes move downward the shape of the track 101 tilts the rakes under the spring pressure of their supporting arms 96, back against the inturned portion of the floor 87, withdrawing the tines from the bundles of grain or hay, and causing them to remain receded until they approach the ground whereupon the track 101 owing to its shape tilts the rakes with their points down into position to effectively perform the function of raking. As each angle bar 90 travels around the lower end of the elevator, the rakes carried thereby rest by gravity with their supporting springs 96, upon the back faces of the angle pieces 90 causing the points of the rakes to bite over the ground. In this position should the points catch against any foreign obstructions they are free to yield upward and thus avoid breaking. As they continue forward around the lower end of the elevator with their arms 96 tilted back away from the rear face of the angle bar 90, they sweep over the periphery of antifriction wheels 102 which are resiliently supported to yield upwardly under extreme upper pressure, but at the same time exerting sufficient downward pressure to assist in holding the points of the rakes firmly against the ground. These antifriction wheels are mounted upon links 103, which are pivoted upon brackets 104, on the floor 86. The free ends of these arms carry said antifriction wheels and the intermediate portions of part of these arms are pivoted to the ends of downwardly extending guide rods 105, which slide upwardly through a transverse support 106, the ends of which are secured to the sides of the frame of the elevator. The upper ends of the guide rods 105 are threaded and carry adjusting nuts 107 and cushioning springs 108, serving to limit the downward movement of wheels 102.

The frame of the elevator is suitably mounted upon the forward end of the body such as by means of a pair of links 110, (see Fig. 1) at the upper end of the elevator and a pair of links 111 at the lower end. The upper links are pivoted by their ends on the shaft 77 and the sides and the body A, while the lower links are pivoted by their ends on shaft 112, which is suitably journaled in the frame of the elevator. To raise and lower the elevator body and hold it adjusted in elevation, cables 114, (see Fig. 1), are secured by their ends at 115 to the sides of the elevator and wound around a winch 116, which is mounted upon the forward end of the body A of the vehicle. This winch is adapted to be turned by the handle 117 and locked in position by the spring dog 118 engaging the teeth of a ratchet wheel 119 on the shaft of the winch. The lower ends of the sides of the elevator are provided with guard wheels 120, which are so positioned as to ride over obstructions which tend to block the progress of the elevator over the ground, the flexible cables 114 permitting this action to take place. In order to counterbalance or assist in relieving the weight of the elevator on the ground, a coil spring 121 is secured between the forward end of the body A of the vehicle and the lower links 111.

To drive the elevator and operate its carrier in the direction of the arrow indicated in Fig. 3 a sprocket wheel 122, (see Fig. 1), is mounted upon the shaft 77, and a sprocket 123 mounted upon the shaft 112, a chain belt 124 being passed around said sprockets 122 and 123. Power is transmitted through the shaft 77 across the elevator to the opposite chain belt to operate both belts of the carrier. Another sprocket 125 is mounted upon the shaft 112 to drive said shaft and is revolved by the endless chain 126 which is passed around a sprocket 127 which is mounted upon the shaft 60, (see Fig. 2) and receives motion therefrom. Clutch 128 is interposed between said sprocket 127 and shaft 60, whereby the elevator may be thrown into or out of operation at will, a handle 129 being pivoted upon the side of the body A and connected by tilting arm 130, rod 131, bell crank 132, link 133, and a rocker arm 141, to the drive member of said clutch 128. The handle 129 is within easy reach of the operator standing upon the platform 113, thus it is obvious the elevator may be operated only when it is desired, and if the body is filled, it may be thrown out of operation and the machine speeded up to carry the contents of the body to where it is to be deposited.

After the body is loaded and it is desired to dump the contents the handle 134 is tilted forward, thus throwing the endless carrier B into operation and ejecting the contents through the end gate. This handle 134 is connected by its arm 135, rod 136, bell crank 137, link 138 and rocker arm 139 to a clutch 140, which is interposed between the shaft 60 and the bevel gear 59, which is freely mounted upon said shaft. During the loading of the body A the apron B may from time to time be moved in the direction of the arrow indicated in Fig. 1 toward the gate, by tilting handle 134, to make room in the forward end of the body for the load.

The shattered grain which is caught and elevated by the angle members 90 is dumped into the body, an incline 142 being formed on the forward end for catching the grain and a guard 143 placed near the bottom of the body at its forward end to direct the grain onto the apron 9. The apron 9 is composed of canvas with flights secured across, adapted to prevent any of the grain being lost.

Where I have used the term "shocks of grain" throughout this specification and in the claims following, I mean it to include grain, grass, corn and other vegetable growth and materials, whether in bound or loose form.

In accordance with the patent statutes I have described the principles of operation of my invention, together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a machine of the class set forth, the combination of a vehicle body, a bundle pick up frame swung freely from an end of said body in substantially upright position to move up and down, a hoist for lifting said frame and holding it in selected elevation, a spring connected with said frame and body for lifting part of the load of said frame to relieve said hoist, bundle pick up mechanism carried by said frame adapted to deliver the bundles from the upper end of said frame into said body, and means for driving said pick up mechanism.

2. In a machine of the class set forth, the combination of a vehicle body, a bundle pick up frame swung freely from an end of said body in substantially upright position to move up and down, a hoist for lifting said frame and holding it in selected elevation, a spring connected with said frame and body for lifting part of the load of said frame to relieve said hoist, an elevating belt carried by said frame, a plurality of forks movably carried by said belt to move outwardly into bundle engaging position at the lower end of said frame and withdrawing from engagement with the bundles at the upper end of said frame to deposit the bundles in said body and means for moving the forks outwardly into bundle engaging position at the lower end of said frame and inwardly at the upper end, for the purposes specified.

In testimony whereof, I have signed my name to this specification, in the presence of two subscribing witnesses.

DAVID F. GEIGER.

Witnesses:
H. L. FISCHER,
F. G. BRADBURY.